(12) United States Patent
Reeder

(10) Patent No.: US 6,437,904 B1
(45) Date of Patent: Aug. 20, 2002

(54) WAVEPLATE POLARIZATION ROTATOR

(75) Inventor: Robin A. Reeder, El Segundo, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/482,378

(22) Filed: Jan. 13, 2000

(51) Int. Cl.[7] .................................................. G02F 1/00
(52) U.S. Cl. ...................... 359/322; 359/246; 359/484; 359/497
(58) Field of Search ................................. 359/280, 256, 359/281, 282, 322, 324, 484, 246, 250, 251, 483, 497; 324/96, 244.1

(56) References Cited

U.S. PATENT DOCUMENTS 3,700,307 A * 10/1972 Glenn ........................ 350/157
5,473,465 A 12/1995 Ye

FOREIGN PATENT DOCUMENTS

EP 0 663 604 7/1995
EP 0 764 858 3/1997

OTHER PUBLICATIONS

Tidwell, S. C. et al.: "Generating Radially Polarized Beams Interferometrically", Applied Optics, US, Opt. Soc. of America, Washington, vol. 29, No. 15; May 20, 1990, pp. 2234–2239.

Tidwell, S. C. et al.: "Efficient Radially Polarized Laser Beam Generation With A Double Interferometer", Applied Optics, US, Opt. Soc. of Am., Wash., vol. 32, No. 27, 20–09–93.

* cited by examiner

*Primary Examiner*—Georgia Epps
*Assistant Examiner*—Tuyen Tra
(74) *Attorney, Agent, or Firm*—Colin M. Raufer; Leonard A. Alkov; Glenn H. Lenzen, Jr.

(57) ABSTRACT

A system (10) for rotating a polarization state of a beam of electromagnetic energy (22) of the present invention. The system (10) includes a first mechanism (16) for receiving the beam of electromagnetic energy (22). The beam of electromagnetic energy (22) is characterized by a first arbitrary polarization state oriented at a first angle. A second mechanism (16, 18, 20) orients the first arbitrary polarization state, via one or more waveplates (16, 18, 20), at a second angle that is different from the first angle. In a specific embodiment, the one or more waveplates (16, 18, 20) include a first quarter waveplate (16) having a principal axis (26) angled at 45° from horizontal relative to a given reference frame. A second quarter waveplate (20) is angled at −45°. The second mechanism (16, 18, 20) includes a phase mechanism (18) that is positioned between the first quarter waveplate (16) and the second quarter waveplate (20) and introduces a desired phase shift to the polarization state of the beam of electromagnetic energy (24) output from the first quarter waveplate (16). The desired phase shift is twice the difference between the first angle and the second angle, which corresponds to a desired angle of rotation of the first arbitrary polarization state.

33 Claims, 2 Drawing Sheets

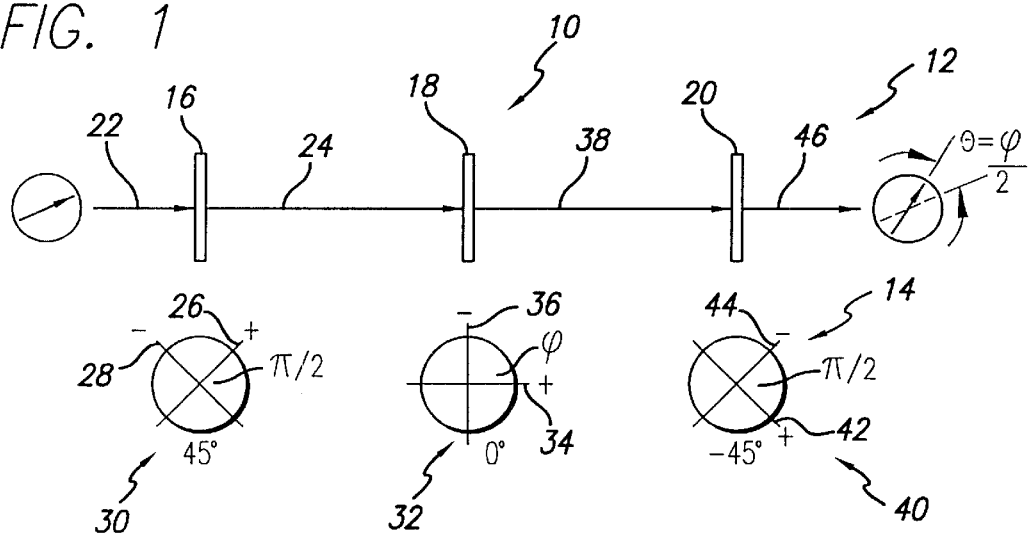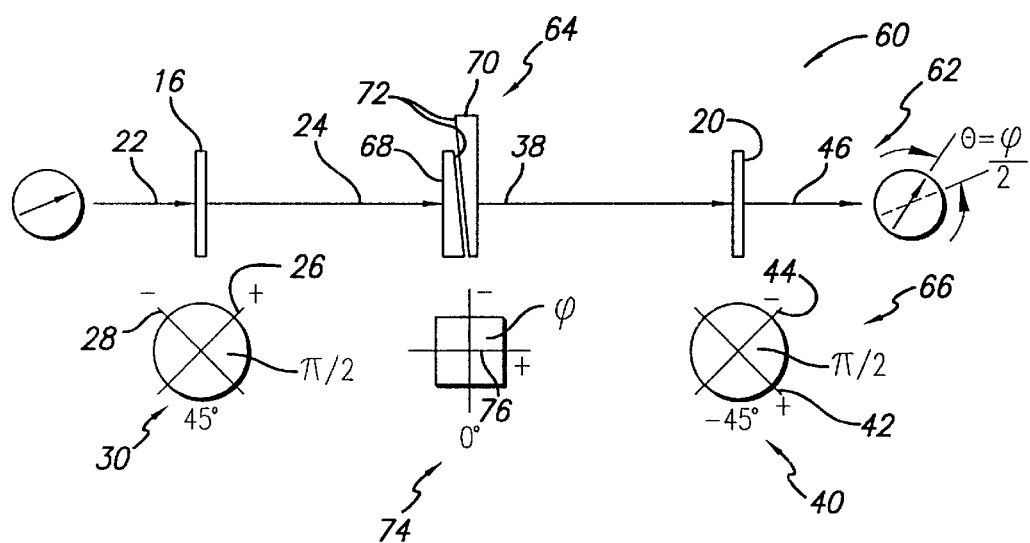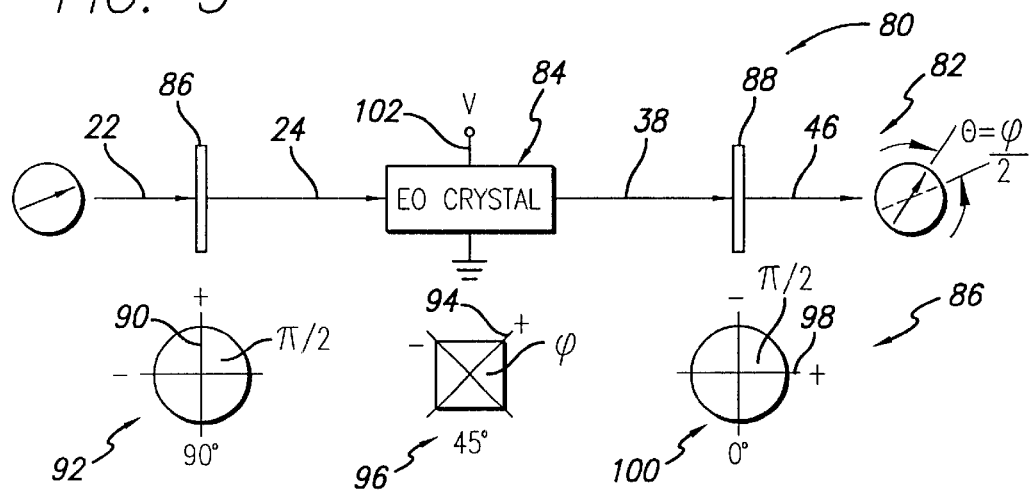

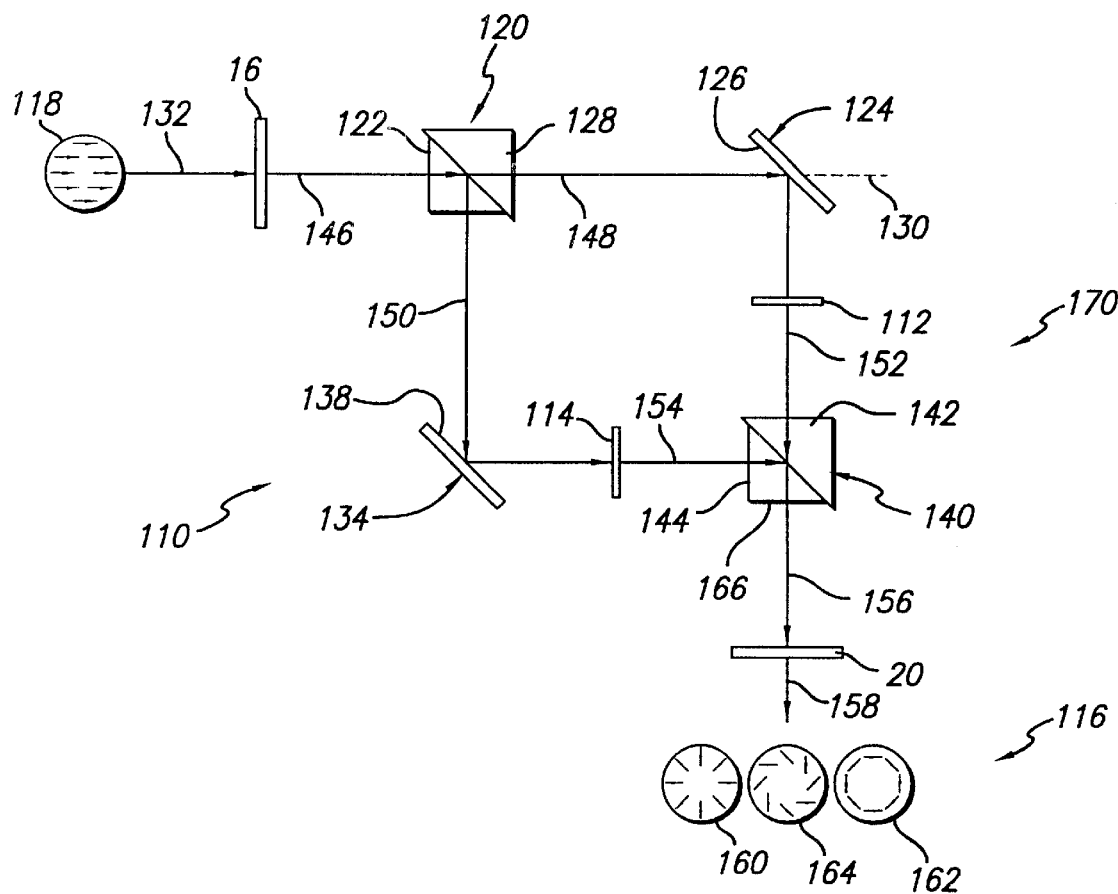
FIG. 4
FIG. 5
FIG. 6

WAVEPLATE POLARIZATION ROTATOR

BACKGROUND OF THE INVENTION

1. Field of Invention

This invention relates to optics. Specifically, the present invention relates to optical rotators for rotating the polarization state of polarized electromagnetic energy.

2. Description of the Related Art

Polarization state rotators rotate the polarization state of an input beam of electromagnetic energy by a predetermined angle. Rotators are employed in a variety of demanding applications including laser rods, electron linear accelerators, and three-dimensional stereovision video applications. Such applications often require cost-effective space-efficient rotators that can efficiently rotate the polarization state of electromagnetic energy of a particular frequency by a predetermined angle.

Half waveplates are often used to rotate a specific linear polarization state by a specified angle. Unfortunately, rotators employing half waveplates are often ineffective at rotating electromagnetic energy with an arbitrary polarization state by a specified angle.

Quartz optically active rotators are typically employed to rotate the polarization state of an arbitrarily polarized light beam. The quartz rotators are constructed from a slab of high-quality optically active quartz. The thickness of the slab determines the angle by which the quartz rotator rotates the polarization state of input electromagnetic energy. Large slabs of the high-quality optically active quartz are often required to achieve a particular rotation angle. For example, a conventional 90-degree quartz rotator may require a slab of quartz more than 1 centimeter long. This large size requirement increases costs and limits the applicability of the rotators to applications with ample space. In addition, due to frequency limitations of quartz, quartz rotators are often only effective over a relatively narrow range of input frequencies. Consequently, such rotators are inapplicable to systems requiring polarization state rotation of electromagnetic energy outside of their frequency range. Furthermore, the single slab design of the quartz rotator provides limited design features. Consequently, incorporation of quartz rotators into systems such as variable phase rotators and double-interferometric polarizers is often inefficient and expensive.

Other inventions by this Applicant also assigned to Raytheon Company include: "Reeder Rotator" (Ser. No. 09/483,254, now U.S. Pat. No. 6,268,962; Attorney Docket No. PD-R98093); "Reeder Rod" (Ser. No. 09/082,230, now U.S. Pat. No. 6,219,455; Attorney Docket No. PD-R98094); and "Reeder Compensator" (Ser. No. 09/482,376, now U.S. Pat. No. 6,317,450; Attorney Docket No. PD-R98098). These applications are incorporated herein by reference.

In some applications, Faraday rotators are employed instead of the conventional optically active quartz rotators. Unfortunately, Faraday rotators are non-reciprocal rotators, such that light reflecting off a mirror and making a second pass through the rotator is rotated in the same direction as the first pass. Faraday rotators are often inapplicable to systems that require reciprocal rotators.

Hence, a need exists in the art for a cost-effective space-efficient reciprocal polarization state rotator that can rotate the polarization state of electromagnetic energy over a wide range of frequencies. There exists a further need for a rotator having flexible design features for accommodating applications such as variable phase rotators and double-interferometric polarizers.

SUMMARY OF THE INVENTION

The need in the art is addressed by the system for rotating a polarization state of a beam of electromagnetic energy of the present invention. In the illustrative embodiment, the inventive system includes a first mechanism for receiving the beam of electromagnetic energy, which is characterized by a first polarization state oriented at a first angle. A second mechanism orients the first polarization state, via one or more waveplates, at a second angle that is different from the first angle.

In a specific embodiment, the one or more waveplates include a first quarter waveplate having a principal axis angled at 45° from horizontal relative to a given reference frame. A second quarter waveplate is angled at −45°. A phase mechanism is positioned between the first quarter waveplate and the second quarter waveplate. The phase mechanism introduces a desired phase shift to the polarization state of the beam of electromagnetic energy coming from the first quarter wave plate. The desired phase shift is twice the difference between the first angle and the second angle, which corresponds to a desired angle of rotation of the first polarization state.

In an illustrative embodiment, the phase mechanism includes a fixed-phase waveplate. In another illustrative embodiment, the phase mechanism includes a variable phase device such as a moving wedge waveplate or an electro-optic crystal. In yet another embodiment, the phase mechanism includes an interferometric arrangement that facilitates the production of radially, tangentially, or combined radially and tangentially polarized light.

The novel design of the present invention is facilitated by the use of waveplates to rotate the polarization state of an input beam of electromagnetic energy by a desired angle. This results in a more compact optical device that can accommodate a wider range of frequencies, is more cost effective, and is generally more easily adapted to meet the needs of current demanding applications than its monolithic quartz rotator counterpart.

BRIEF DESCRIPTION OF THE DRAWINGS

FIG. 1 is a diagram of a fixed waveplate rotator of the present invention showing three constituent waveplates and corresponding plots depicting the principal axis of the waveplates.

FIG. 2 is a diagram of a first embodiment of a differential waveplate rotator of the present invention showing constituent waveplates, including a moving wedge waveplate, and corresponding plots showing the principal axis of the waveplates.

FIG. 3 is a diagram of a second embodiment of a differential waveplate rotator of the present invention showing constituent optical devices, including an electro-optic crystal, and corresponding plots showing the principal axis of the optical devices.

FIG. 4 is a diagram of an interferometric rotator of the present invention employing spiral phase delay plates and showing possible output polarization states given a particular linear input polarization state.

FIG. 5 is a phase plot of the left-hand spiral phase delay pate of FIG. 4.

FIG. 6 is a phase plot of the right-hand spiral phase delay plate of FIG. 4.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a diagram of a fixed waveplate rotator 10 of the present invention showing three constituent waveplates 12 and corresponding plots 14 depicting the principal axis of the waveplates 12. The waveplates 12 include, from left to right, a first quarter waveplate 16, a fixed-phase waveplate 18, and a second quarter waveplate 20. The waveplates 16, 18, and 20 are parallel to each other and centered along an axis (not shown) coincident with a first light beam 22.

In operation, the first light beam 22 has an arbitrary input linear polarization state and is input to the first quarter waveplate 16. The first quarter waveplate 16 subsequently outputs a second light beam 24 having x and y linear polarization states. The x and y linear polarization states are aligned with a positive principal axis 26 and a negative axis 28, respectively, of the first quarter waveplate 16, as showing in corresponding first plot 30. The first quarter waveplate is at 45° since the positive principal axis 26 is angled 45° with respect to a horizontal line (not shown). As is known in the art, a quarter waveplate introduces a π/2 or 90 degree phase difference between input linear polarization states.

The waveplates 16, 18, and 20 are constructed from birefringent materials via processes known in the art. Frequency limitations and material limitations on the materials required to construct the waveplates 16, 18, and 20 are generally less than the corresponding frequency and material limitations on existing optically active quartz rotators.

The second light beam 24 is input to the fixed-phase waveplate 18. As shown in a corresponding fixed-phase waveplate plot 32, a positive principal axis 34 is horizontal, and a corresponding negative axis 36 is vertical. Consequently, the fixed waveplate 18 is at 0°. The fixed-phase waveplate 18 introduces a phase difference of φ between linear polarization states comprising the second light beam 24. φ is equal to twice the desired rotation angle (θ) of the polarization state of the first light beam 22. The fixed-phase waveplate 18 subsequently outputs a third light beam 38.

The third light beam 38 is input to the second quarter waveplate 20. In a corresponding quarter waveplate plot 40, a positive principal axis 42 of the quarter waveplate 20 is angled −45° from horizontal, while a negative axis 44 is angled 45° from horizontal. The second quarter waveplate 20 is said to be at −45°. The second quarter waveplate 20 converts the polarization state of the third light beam 38 into a new polarization state equivalent to the original polarization state of the first light beam 22 but angled by the desired rotation angle θ. The second quarter waveplate 20 subsequently outputs a fourth beam of light 46 characterized by the new polarization angle.

In accordance with the present description, a waveplate is a retardation plate, which is an optical element having two principal axes, slow and fast, that resolve an incident polarized beam into two mutually perpendicular polarized beams. The emerging beam recombines to form a particular single polarized beam. In the present embodiment, the single polarized beam is an elliptically polarized beam. Retardation plates are often employed to produce half-wave and quarter-wave retardations, however other retardations are possible.

Those skilled in the art will appreciate that the present invention is applicable to a variety of input polarization states other than linear polarization states. Also, those skilled in the art will appreciate that the orientation of the waveplate rotator 10 may be altered without departing from the scope of the present invention. For example, the waveplate rotator 10 may be rotated by any angle along the beam axis (not shown) coincident with the light beams 22, 24, 38.

Any polarization state is decomposable into a linear combination of left and right circular polarization states. The waveplate rotator 10 of the present invention introduces a phase shift between left-hand and right-hand circular polarization states. The circular polarization states are converted to x and y linear polarization states that are parallel to the horizontal axis 34 and vertical axis 36, respectively, of the second plot 32, via the first quarter waveplate 16, which is at 45°. The fixed-phase waveplate 18, which is at 0°, subsequently introduces the phase difference φ between the linear states that is equal to twice the desired angle of rotation θ. The third quarter waveplate 20, which is at −45°, converts the resulting linear polarization states back into their original circular states but angled by θ.

The operation of the waveplate rotator 10 may be described via Jones matrices. An electric field vector, such as a vector containing information about the orientation of a polarization state, may be represented via a two-element column vector. An electric field vector E altered by an optic, such as a waveplate described by the Jones matrix J, results in the altered electric field E', which is described by the following equation:

$$E' = JE, \qquad [1]$$

where the product JE is implemented in accordance with matrix multiplication rules known in the art.

The general Jones matrix for waveplate characterized by a phase difference of φ and having a principal axis oriented at α degrees is denoted W(φ,α) and is given by the following equation:

$$W(\varphi, \alpha) = \begin{pmatrix} \cos\alpha & -\sin\alpha \\ \sin\alpha & \cos\alpha \end{pmatrix} \begin{pmatrix} e^{i\frac{\varphi}{2}} & 0 \\ 0 & e^{-i\frac{\varphi}{2}} \end{pmatrix} \begin{pmatrix} \cos\alpha & \sin\alpha \\ -\sin\alpha & \cos\alpha \end{pmatrix}, \qquad [2]$$

where $$\begin{pmatrix} e^{i\frac{\varphi}{2}} & 0 \\ 0 & e^{-i\frac{\varphi}{2}} \end{pmatrix}$$

is the principal Jones matrix, which is the Jones matrix for a waveplate having a principal axis oriented at 0° with respect to a given laboratory measurement reference frame; the matrices $$\begin{pmatrix} \cos\alpha & -\sin\alpha \\ \sin\alpha & \cos\alpha \end{pmatrix} \quad \text{and} \quad \begin{pmatrix} \cos\alpha & \sin\alpha \\ -\sin\alpha & \cos\alpha \end{pmatrix}$$

represent rotation transformation matrices.

The Jones matrix for a quarter waveplate is $$W(\frac{\pi}{2}, \alpha),$$

a which introduces a phase difference of π/2 radians or 90° between electric field components that are aligned with principal axis of the quarter waveplate. Circularly polarized light is converted to linearly polarized light via a quarter waveplate. Right-hand and left-hand circular polarization states are converted to orthogonal linear polarization states via a quarter waveplate.

The first quarter waveplate 16 is described by the Jones matrix $$W\left(\frac{\pi}{2}, 45°\right)$$

and outputs linearly polarized light given circularly polarized or linearly polarized input light. The output linearly polarized light is characterized by polarization state angled +/−45° with respect horizontal.

The fixed-phase waveplate 18 is described by the Jones matrix W(2θ,0°), where θ is the desired rotation angle by which the waveplate rotator 10 rotates the polarization state of the input beam of light 22. As discussed more fully below, the fixed-phase waveplate may be replaced by a variable-phase optic such a tilt tunable waveplate, an electro-optic crystal, or a moving wedge waveplate constructed from birefringent wedges.

The second quarter waveplate 20 is described by the Jones matrix $$W\left(\frac{\pi}{2}, -45°\right).$$

The composite Jones matrix ($J_{rotator}$) for the waveplate rotator 10 is given by the following equation:

$$J_{rotator} = W(\pi/2, -45°)W(2\theta, 0°)W(\pi/2, 45°), \quad [3]$$

Expanding the right side of equation (3) yields:

$$J_{rotator} = \left[\frac{1}{2}\begin{pmatrix} 1 & 1 \\ -1 & 1 \end{pmatrix}\begin{pmatrix} e^{i\frac{\pi}{4}} & 0 \\ 0 & e^{-i\frac{\pi}{4}} \end{pmatrix}\begin{pmatrix} 1 & -1 \\ 1 & 1 \end{pmatrix}\right]\begin{pmatrix} e^{j\theta} & 0 \\ 0 & e^{-j\theta} \end{pmatrix} \quad [4]$$

$$\left[\frac{1}{2}\begin{pmatrix} 1 & -1 \\ 1 & 1 \end{pmatrix}\begin{pmatrix} e^{i\frac{\pi}{4}} & 0 \\ 0 & e^{-i\frac{\pi}{4}} \end{pmatrix}\begin{pmatrix} 1 & 1 \\ -1 & 1 \end{pmatrix}\right]$$

$$= \begin{pmatrix} \cos\theta & -\sin\theta \\ \sin\theta & \cos\theta \end{pmatrix}$$

$$= Rot(\theta),$$

where Rot(θ) is the rotation matrix. Rot(θ) rotates a two-dimensional column vector, such as a vector representing a polarization state E, by the angle θ, when applied to the state E in accordance with equation (1). Hence, the waveplates 12 implement the rotator 10, which rotates the polarization state of the polarized input beam of light 22 by the angle θ and subsequently outputs the fourth beam of light 46, which is characterized by a polarization state similar to the polarization state of the first beam of light 22 but rotated by the angle θ.

In equation (4), $$\left[\frac{1}{2}\begin{pmatrix} 1 & -1 \\ 1 & 1 \end{pmatrix}\begin{pmatrix} e^{j\frac{\pi}{4}} & 0 \\ 0 & e^{-j\frac{\pi}{4}} \end{pmatrix}\begin{pmatrix} 1 & 1 \\ -1 & 1 \end{pmatrix}\right]$$

is the Jones matrix, denoted $$W\left(\frac{\pi}{2}, 45°\right),$$

for the third waveplate 20, which is at −45°.

$$\begin{pmatrix} e^{j\theta} & 0 \\ 0 & e^{-j\theta} \end{pmatrix}$$

is the Jones Matrix, denoted W(2θ,0°), for the fixed-phase waveplate 18, which has a phase difference of 2θ, where θ is a desired angle of rotation of the polarization state of the first input beam of light 22.

$$\left[\frac{1}{2}\begin{pmatrix} 1 & 1 \\ -1 & 1 \end{pmatrix}\begin{pmatrix} e^{i\frac{\pi}{4}} & 0 \\ 0 & e^{-i\frac{\pi}{4}} \end{pmatrix}\begin{pmatrix} 1 & -1 \\ 1 & 1 \end{pmatrix}\right]$$

is the Jones matrix, denoted $$W\left(\frac{\pi}{2}, -45°\right),$$

for the first quarter waveplate 16 at 45°.

Equation (3) is the Jones matrix for the waveplate rotator 10 at a particular orientation. However, the waveplate rotator 10 may be angled at any angle ξ about an axis parallel to the light beams 22, 24, 38, and 46 as illustrated by the following equation:

$$W\left(\frac{\pi}{2}, \xi - 45°\right)W(2\theta, \xi)W\left(\frac{\pi}{2}, \xi + 45°\right) = Rot(\theta). \quad [5]$$

where W(φ,α) is defined above.

The waveplates 12 may be constructed from a variety of uniformly birefringent mediums, which extends the applicability of the waveplate rotator 10 to a broader frequency range. Relative to a conventional quartz rotator (not shown), the rotator 10 of the present invention requires less optical material. In addition, a wider choice of optical materials is available to construct the rotator 10. As a result, the rotator 10 places fewer space design constraints and frequency design constraints upon the systems in which the rotator 10 is employed. For example, larger versions of the rotator 10 may be constructed for the same price as a smaller conventional quartz rotator, and the rotator 10 may be designed, via proper selection of materials, to accommodate wider bandwidth of electromagnetic energy, a narrower bandwidth, or a specific frequency for which optical active quartz is not available.

The spacing between the waveplates 12 is application-specific and may be easily determined by one ordinarily skilled in the art to meet the needs of a given application. The constructions of waveplates such as the waveplates 12 are known in the art.

Those skilled in the art will appreciate that the positions of first quarter waveplate 16 and the second quarter waveplate 20 may be interchanged without departing from the scope of the present invention. Furthermore, while the waveplates 12 are shown as separate devices, they may easily be combined into a single monolithic structure. In addition, the waveplates 12 may be replaced by equivalent optical components. For example, the waveplates 16 and 20 may be constructed from pairs of higher order waveplates, each pair having constituent waveplates whose phases differ by π/2, i.e., a quarter wave. In this case, the fast axis of one waveplate is parallel to the slow axis of the other.

Those skilled in the art will appreciate that, unlike conventional rotators that are often limited to specific input polarization states, the present invention, as exemplified by the system 10, will efficiently rotate an arbitrary polarization state by a predetermined angle.

FIG. 2 is a diagram of a first embodiment of a differential waveplate rotator 60 of the present invention showing constituent waveplates 62, including a moving wedge waveplate 64, and corresponding plots 66 showing the principal axis of the waveplates 62. The differential waveplate rotator 60 includes, from left to right, the first quarter waveplate 16 at 45°, the moving wedge waveplate 64, and the second quarter waveplate 20. The waveplates 62 are centered and aligned along and perpendicular to a beam axis (not shown) that is parallel to the first beam light 22 that is input to the first quarter waveplate 16.

The operation of the differential waveplate rotator 60 is similar to the operation of the waveplate rotator 10 of FIG. 1 with the exception that the fixed-phase waveplate 18 of FIG. 1 is replaced by the moving wedge waveplate 64 in FIG. 2. The phase (φ) of the moving wedge waveplate 64 is variable and is equal to 2θ, where θ is the desired angle of rotation. The moving wedge waveplate 64 constructed from a uniaxial uniformly birefringent material such as calcite, quartz, or sapphire and includes a fixed piece 68 and a moveable piece 70. The fixed piece 68 and the moveable piece 70 have facing angled faces 72. The moveable piece 70 may be moved up and down causing the angled faces 72 to slide with respect to each other and causing the effective thickness of the moving wedge waveplate 64 to vary as the moveable piece 70 moves. The phase φ of the moving wedge waveplate 64 varies in with the effective thickness of the moving wedge waveplate 64, which is the thickness of the moving wedge waveplate 64 along an axis (not shown) coincident with the first beam of light 22. Consequently, the rotation angle θ may be adjusted via movement of the moveable piece 70.

A corresponding moving wedge phase plot 74 is shown, which represents the combined phase plot for both the fixed piece 68 and the moveable piece 70 of the moving wedge waveplate 64. As is shown in the plot 74, the moving wedge waveplate 64 is at 0° and has a principal axis 76 angled 0° from horizontal.

The Jones matrix of the differential waveplate rotator 60 is also described by with equation (5), however, as discussed above, the desired angle of rotation θ is changeable via movement of the moveable piece 70.

The moving wedge waveplate 64 may be replaced with another variable phase optical device, such as a tilt tunable waveplate or an electro-optic (EO) crystal as discussed more fully below. For example, the moving wedge waveplate 64 may be replaced with a device whose phase φ varies with the wavelength of the first beam of light 22. In this case, the first quarter waveplate 16 and the second quarter waveplate 20 are preferably implemented via Fresnel rhombs so that the waveplates 16 and 20 remain quarter waveplates at various wavelengths of interest.

FIG. 3 is a diagram of a second embodiment of a differential waveplate rotator 80 of the present invention showing constituent optical devices 82, including an electro-optic crystal 84 and corresponding plots 86 showing the principal axis of the optical devices 82. The differential rotator 80 includes, from left to right, an input quarter waveplate 86 at 90°, the electro-optic crystal 84, and an output quarter waveplate 88 at 0°, all centered along an axis (not shown) that is coincident with the first input beam of light 22.

The input quarter waveplate 86 has a principal axis 90 oriented at 90° from horizontal, as shown in a first plot 92 corresponding to the input quarter waveplate 86. The electro-optic crystal 84 has a principal axis 94 that is oriented at an angle of 45° from horizontal, as shown in a second plot 96 corresponding to the electro-optic crystal 84. The electro-optic crystal 84 is characterized by a phase shift of φ. The output quarter waveplate 88 has a principal axis 98 oriented at 0° from horizontal as shown in a corresponding third plot 100.

The electro-optic crystal 84 has a voltage-dependent phase φ that is controllable via the application of a voltage (V) applied at a voltage terminal 102 of the electro-optic crystal 84. The phase φ of the electro-optic crystal 84 varies as a function of the voltage V applied at the terminal 102 in accordance with the following equation:

$$\varphi = \frac{\pi}{2} \frac{V}{V_{\lambda/2}} \qquad [6]$$

where $V_{\lambda/2}$ is the half-wave voltage of the electro-optic crystal 84, which is the voltage that causes a phase retardation of π.

The differential rotator 80 is characterized by the following equation:

$$W\left(\frac{\pi}{2}, 0°\right)W(2\theta, 45°)W\left(\frac{\pi}{2}, 90°\right) = Rot(\theta), \qquad [7]$$

where the variables are as mentioned previously;

$$W\left(\frac{\pi}{2}, 0°\right)$$

is the Jones matrix for the output quarter waveplate 88 at 0°; W(2θ,45°) is the Jones matrix for the electro-optic crystal 84, where φ=2θ and is variable as mentioned above;

$$W\left(\frac{\pi}{2}, 90°\right)$$

is the Jones matrix for the input quarter waveplate 86 at 90°; and Rot(θ) is the rotation transformation as mentioned previously.

If the phase of the middle optic, which is the fixed-phase waveplate 18 in FIG. 1, the moving wedge waveplate 64 in FIG. 2, and the electro-optic crystal 84 in FIG. 3, is replaced with an optical device having a phase shift that varies linearly with angle, where the phase shift is constant along a radial line, then linear polarized input light is transformed into radially polarized light or tangentially polarized light depending on the absolute phase of the optical device. This results in unique polarizer having a variety of applications including electron linear accelerators. A specific embodiment of the polarizer of the present invention is discussed more fully below.

FIG. 4 is a diagram of an interferometric polarization converter, i.e., rotator 110 of the present invention employing a left-hand spiral phase delay plate 112 and a right-hand spiral phase delay plate 114 and showing possible output polarization states 116 given a particular linear input polarization state 118. The interferometric rotator 110 includes the first input quarter waveplate 16 at 45°. A beam-splitting polarizer 120 is positioned after the first quarter waveplate 16 so that an input aperture 122 of the beam-splitting polarizer 120 is parallel to the first quarter waveplate 16.

A first mirror 124 is positioned after the beam-splitting polarizer 120 so that a first reflective surface 126 of the first mirror 124 faces toward a first output aperture 128 of the beam-splitting polarizer 120 at a downward angle of approximately 45°. The first mirror 124 is angled approximately 135° relative to a first optical axis 130 that is parallel to a linear polarized light beam 132 that is input perpendicular to the first quarter waveplate 16. A second mirror 134 faces a second output aperture 136 of the beam-splitting polarizer 120 at a 45° angle such that a reflective surface 138 of the second mirror 134 faces and is parallel to the reflective surface 126 of the first mirror 124.

The right-hand spiral phase delay plate 114 is positioned after the second mirror 134 at an angle of approximately 45° relative to the reflective surface 138 of the second mirror 134. In this orientation, right-hand spiral phase delay plate 114 is parallel to the first output aperture 128 and perpendicular to the second output aperture 136 of the beam-splitting polarizer 120. The left-hand spiral phase delay plate 112 is positioned after the first mirror 124 at an angle of approximately 45° relative to the reflective surface 126 of the first mirror 124. In this orientation, the left-hand spiral phase delay plate 112 is parallel to the first output aperture 128 and perpendicular to the second output aperture 136 of the beam-splitting polarizer 120. The left-hand spiral phase delay plate 112 and the right hand spiral phase delay plate 114 are perpendicular to each other and are parallel to a first input aperture 142 and a second input aperture 144, respectively, of a beam-combining polarizer 140. An output aperture 166 of the beam-combining polarizer 140 faces the second quarter waveplate 20, which is at −45°. The beam-splitting polarizer 120, the first mirror 124, the second mirror 134, the first spiral phase delay plate 112, the second spiral phase delay plate 114, and the beam-combining polarizer 140 form a double interferometric optical arrangement 170.

In operation, the input beam 132 of linear polarized light passes perpendicularly through the first quarter waveplate 16 and outputs a second linearly polarized light beam 146 having polarization states aligned with a principal axis of the quarter waveplate 16. The second linearly polarized beam 146 enters the beam-splitting polarizer 120 approximately perpendicular to the input aperture 122; is split into third beam 148 and a fourth beam 150, which are output from the first output aperture 128 and the second output aperture 136, respectively. The third beam 148 is deflected 90° via the first mirror 124 and subsequently passes perpendicularly through the left-hand spiral phase delay plate 112, which outputs a first radial phase-delayed beam 152 in response thereto. The first radial phase-delayed beam 152 passes perpendicularly into the first input aperture 142 of the beam-combining polarizer 140. The fourth beam 148 is deflected 90° via the second mirror 134 and subsequently passes perpendicularly through the right-hand spiral phase delay plate 114, which outputs a second radial phase-delayed beam 154 in response thereto. The second radial phase-delayed beam 154 passes perpendicularly into the second input aperture 144 of the beam-combining polarizer 140. The beam-combining polarizer 140 subsequently combines the fist radial phase-delayed beam 152 and the second radial phase-delayed beam 154 into a combined beam 156. The combined beam 156 then passes perpendicularly through the second quarter waveplate 20. The second quarter waveplate 20 provides an output beam 158 that is either radially polarized, as shown in a radial plot 160, tangentially polarized, as shown in a tangential plot 162, or both radially polarized and tangentially polarized, as shown in a combined plot 164. The polarization state of the output beam 158 depends on the path difference between the path formed by the beams 150 and 154 and the path formed by the beams 148 and 152, which affects absolute phase. Hence, the output polarization state given a certain input polarization state is adjustable by selectively adjusting the different path lengths.

The beam-combining polarizer 140 is similar to the beam-splitting polarizer 120. Beam-splitting and beam-combining polarizers are known in the art and may be constructed from birefringent materials.

The interferometric rotator 110 is interferometric in that the two beams 148 and 150 split by the beam-splitting polarizer 120 are recombined via the beam-combining polarizer 140, where absolute phase determines the polarization state of the output beam 158, which is either radial, tangential, or a combination thereof, as shown in plots 160, 162, and 164, respectively, of the output polarization states 116.

Previous double-interferometric methods of obtaining radial polarized light using spiral phase delay plates are generally more complex and expensive than the interferometric rotator 110 of the present invention.

The spiral phase delay waveplates 112 and 114 have a delay of $2\pi$ (360°) each and may be replaced by one spiral phase delay plate (not shown) with a phase delay of $4\pi$ about a circle centered on the spiral phase delay plate without departing from the scope of the present invention.

FIG. 5 is a phase plot 112' of the left-hand spiral phase delay plate 112 of FIG. 4. The phase varies linearly with angle about the center 172 of the left-hand plot 112', which corresponds to the center of the left-hand spiral phase delay plate 112. The linearly varying phase is represented as a clockwise gradient 174 from light to dark. The phase changes by one wavelength for an angle change of 360°. This is accomplished via a coating whose thickness varies linearly with angle and causes the phase to vary linearly with angle.

FIG. 6 is a phase plot 114' of the right-hand spiral phase delay plate 114 of FIG. 4. The right-hand plot 114' is similar to the left-hand plot 112' of FIG. 5 with the exception that the plot 114' has a counter clockwise gradient 176 that varies counter clockwise about a center 178 of the plot 114' from light to dark rather than clockwise from light to dark as in the gradient 174 of FIG. 5.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,
What is claimed is:
1. A system for rotating an arbitrary polarization state of a beam of electromagnetic energy comprising:
first means for receiving said beam of electromagnetic energy, said beam of electromagnetic energy characterized by a first arbitrary polarization state oriented at a first angle and
second means for orienting said first arbitrary polarization state at a second angle different from said first angle via one or more waveplates, said one or more waveplates including a first quarter waveplate oriented at approximately 45 degrees for receiving said beam of electromagnetic energy characterized by said first arbitrary polarization state and providing a beam characterized by a second polarization state as output in response thereto and a second quarter waveplate, said second quarter waveplate being at approximately −45 degrees.

2. The system of claim 1 wherein said second means includes phase means positioned between said first quarter waveplate and said second quarter waveplate for introducing a desired phase shift to said second polarization state.

3. The system of claim 2 wherein said desired phase shift is twice the difference between said first angle and said second angle, which corresponds to a desired angle of rotation of said first arbitrary polarization state.

4. The system of claim 2 wherein said phase means includes a fixed-phase waveplate.

5. The system of claim 2 wherein said phase means includes a moving wedge waveplate.

6. The system of claim 2 wherein said phase means includes an electro-optic crystal.

7. The system of claim 2 wherein said phase means includes a double interferometric polarizer arrangement.

8. A system for selectively altering a property of the polarization state of input electromagnetic energy comprising:

first means for receiving input electromagnetic energy of a first input polarization state and converting said first input polarization state into a first linear polarization state;

second means for operating on said first linear polarization state to introduce an alteration to said property and providing altered electromagnetic energy in response thereto; and third means for performing an inverse of said first means on said altered electromagnetic energy to yield output electromagnetic energy having a polarization state similar to said first input polarization state but altered by said alteration.

9. The system of claim 8 wherein said first means includes first quarter wave means for introducing approximately a positive quarter wave shift in said input electromagnetic energy and providing said first linear polarization state in response thereto.

10. The system of claim 9 wherein said second means includes second quarter wave means for introducing approximately a negative quarter wave shift in said altered electromagnetic energy and providing said output electromagnetic energy in response thereto.

11. The system of claim 8 wherein said property is an angle associated with said input polarization state.

12. The system of claim 8 wherein said system is described by the following equation:

$$\left[\frac{1}{2}\begin{pmatrix}1 & 1 \\ -1 & 1\end{pmatrix}\begin{pmatrix}e^{j\frac{\pi}{4}} & 0 \\ 0 & e^{-j\frac{\pi}{4}}\end{pmatrix}\begin{pmatrix}1 & -1 \\ 1 & 1\end{pmatrix}\right]$$

$$\begin{pmatrix}e^{j\theta} & 0 \\ 0 & e^{-j\theta}\end{pmatrix}\left[\frac{1}{2}\begin{pmatrix}1 & -1 \\ 1 & 1\end{pmatrix}\begin{pmatrix}e^{j\frac{\pi}{4}} & 0 \\ 0 & e^{-j\frac{\pi}{4}}\end{pmatrix}\begin{pmatrix}1 & 1 \\ -1 & 1\end{pmatrix}\right]=\begin{pmatrix}\cos\theta & -\sin\theta \\ \sin\theta & \cos\theta\end{pmatrix}$$

where $$\left[\frac{1}{2}\begin{pmatrix}1 & -1 \\ 1 & 1\end{pmatrix}\begin{pmatrix}e^{j\frac{\pi}{4}} & 0 \\ 0 & e^{-j\frac{\pi}{4}}\end{pmatrix}\begin{pmatrix}1 & 1 \\ -1 & 1\end{pmatrix}\right]$$

is the Jones matrix, denoted $$W(\frac{\pi}{2}, 45°),$$

for said third means, which is a 45° quarter waveplate;

$$\begin{pmatrix}e^{j\theta} & 0 \\ 0 & e^{-j\theta}\end{pmatrix}$$

is the Jones Matrix, denoted W(2θ,0°), for said second means, which is a waveplate characterized by a phase difference of 2θ, where θ is a desired angle of rotation of said input polarization state, said alteration of said property corresponding to a rotation of an angle of said input polarization state;

$$\left[\frac{1}{2}\begin{pmatrix}1 & 1 \\ -1 & 1\end{pmatrix}\begin{pmatrix}e^{j\frac{\pi}{4}} & 0 \\ 0 & e^{-j\frac{\pi}{4}}\end{pmatrix}\begin{pmatrix}1 & -1 \\ 1 & 1\end{pmatrix}\right]$$

is the Jones matrix, denoted $$W(\frac{\pi}{2}, -45°),$$

for said first means, which is a −45° quarter waveplate; and wherein $$\begin{pmatrix}\cos\theta & -\sin\theta \\ \sin\theta & \cos\theta\end{pmatrix}$$

is a matrix for a polarization rotator having a rotation angle of θ.

13. The system of claim 8 wherein said system is described by the following equation:

$$W(\frac{\pi}{2}, \xi-45°)W(2\theta, \xi)W(\frac{\pi}{2}, \xi+45°) = Rot(\theta),$$

where ξ is an arbitrary angle; W(φ,α) is the Jones matrix for a waveplate with a phase difference of φ and with a principal axis oriented at angle of α from horizontal.

14. The system of claim 8 wherein said property is said polarization state of said input electromagnetic energy.

15. The system of claim 14 wherein said second means includes a first beam splitting polarizer for providing a first polarized beam of electromagnetic energy and a second polarized beam of electromagnetic energy.

16. The system of claim 15 wherein said second means further includes a first mirror for reflecting said first beam of electromagnetic energy and providing a first reflected beam in response thereto, and includes a second mirror for reflecting said second beam of electromagnetic energy and providing a second reflected beam in response thereto.

17. The system of claim 16 wherein said second means further includes a right hand spiral phase delay plate that receives said first reflected beam and provides a first intermediate polarized beam in response thereto.

18. The system of claim 17 wherein said second means further includes a left hand spiral phase delay plate that receives said second reflected beam and provides a second intermediate polarized beam in response thereto.

19. The system of claim 18 wherein said second means further includes a beam combining polarizer for combining said first intermediate polarized beam and said second intermediate polarized beam and providing a combined polarized beam in response thereto, said combined polarized beam corresponding to said altered electromagnetic energy.

20. The system of claim 19 wherein said first means is a 45° quarter waveplate and said third means is −45° quarter waveplate.

21. The system of claim 20 wherein said alteration of the property of the polarization state of said input electromagnetic energy includes a change from said first arbitrary polarization state to different polarization state.

22. The system of claim 21 wherein said different polarization state is a tangential, circular, or combined tangential and circular polarization state.

23. The system of claim 21 further including means for altering said different polarization state by selectively changing a path length of a path of electromagnetic energy from said splitting polarizer to said combining polarizer.

24. A waveplate rotator comprising:
a first quarter waveplate at approximately 45 degrees for receiving a first beam of electromagnetic energy having a first arbitrary polarization state, and outputting a second beam in response thereto;
a waveplate at approximately 0 degrees for receiving said second beam and providing a third beam in response thereto, said waveplate characterized by a phase shift of 2θ, where θ is a desired angle of rotation of said first arbitrary polarization state; and
a second quarter waveplate at approximately −45 degrees for receiving said third beam and outputting a fourth beam in response thereto, said fourth beam having a polarization state similar to said first arbitrary polarization state but rotated by θ.

25. A method for rotating a polarization state of a beam of electromagnetic energy comprising the steps of:
receiving said beam of electromagnetic energy, said beam of electromagnetic energy characterized by a first arbitrary polarization state oriented at a first angle and
orienting said first arbitrary polarization state at a second angle different from said first angle via one or more waveplates, said one or more waveplates including:
a first quarter waveplate oriented at approximately 45 degrees for receiving said beam of electromagnetic energy characterized by said first arbitrary polarization state and providing a beam characterized by a second polarization state as output in response thereto and
a second quarter waveplate, said second quarter waveplate being at approximately −45 degrees for introducing a desired phase shift to the polarization state of the beam of electromagnetic energy from the first quarter waveplate.

26. A system for rotating an arbitrary polarization state of a beam of electromagnetic energy comprising:
first means for receiving said beam of electromagnetic energy, said beam of electromagnetic energy characterized by a first arbitrary polarization state oriented at a first angle and
second means for orienting said first arbitrary polarization state at a second angle different from said first angle via one or more waveplates, said one or more waveplates including:
a first quarter waveplate for receiving said beam of electro magnetic energy characterized by said first arbitrary polarization state and providing a beam characterized by a second polarization state as output in response thereto,
a second quarter waveplate, and
phase means positioned between said first quarter waveplate and said second quarter waveplate for introducing a desired phase shift to said second polarization state, said desired phase shift being twice the difference between said first angle and said second angle, which corresponds to a desired angle of rotation of said first arbitrary polarization state.

27. The system of claim 26 wherein said phase means includes a fixed-phase waveplate.

28. The system of claim 26 wherein said phase means includes a moving wedge waveplate.

29. The system of claim 26 wherein said phase means includes an electro-optic crystal.

30. The system of claim 26 wherein said phase means includes a double interferometric polarizer arrangement.

31. A system for rotating an arbitrary polarization state of a beam of electromagnetic energy comprising:
first means for receiving said beam of electromagnetic energy said beam of electromagnetic energy characterized by a first arbitrary polarization state oriented at a first angle and
second means for orienting said first arbitrary polarization state at a second angle different from said first angle via one or more waveplates, said one or more waveplates including:
a first quarter waveplate for receiving said beam of electromagnetic energy characterized by said first arbitrary polarization state and providing a beam characterized by a second polarization state as output in response thereto,
a second quarter waveplate, and
phase means positioned between said first quarter waveplate and said second quarter waveplate for introducing a desired phase shift to said second polarization state, said phase means including a double interferometric polarizer arrangement.

32. A system for rotating an arbitrary polarization state of a beam of electromagnetic energy comprising:
first means for receiving said beam of electromagnetic energy, said beam of electromagnetic energy characterized by a first arbitrary polarization state oriented at a first angle and
second means for orienting said first arbitrary polarization state at a second angle different from said first angle via one or more waveplates, said one or more waveplates including:
a first quarter waveplate for receiving said beam of electromagnetic energy characterized by said first arbitrary polarization state and providing a beam characterized by a second polarization state as output in response thereto,
a second quarter waveplate, and phase means positioned between said first quarter waveplate and said second quarter waveplate for introducing a desired phase shift to said second polarization state, said phase means including a moving wedge waveplate.

33. A system for rotating an arbitrary polarization state of a beam of electromagnetic energy comprising:

first means for receiving said beam of electromagnetic energy, said beam of electromagnetic energy characterized by a first arbitrary polarization state oriented at a first angle and second means for orienting said first arbitrary polarization state at a second angle different from said first angle via one or more waveplates, said one or more waveplates including:
- a first quarter waveplate for receiving said beam of electromagnetic energy characterized by said first arbitrary polarization state and providing a beam characterized by a second polarization state as output in response thereto,
- a second quarter waveplate, and
- phase means positioned between said first quarter waveplate and said second quarter waveplate for introducing a desired phase shift to said second polarization state, said phase means including an electro-optic crystal.

\* \* \* \* \*